(No Model.)

C. C. HILL.

CARTRIDGE LOADING MACHINE.

No. 389,385. Patented Sept. 11, 1888.

6 Sheets—Sheet 3.

Witnesses:
Lew. E. Curtis.
H. W. Munday.

Inventor:
Christian C. Hill.
By Munday, Evarts & Adcock
his Attorneys.

(No Model.)  6 Sheets—Sheet 4.
C. C. HILL
CARTRIDGE LOADING MACHINE.
No. 389,385. Patented Sept. 11, 1888.
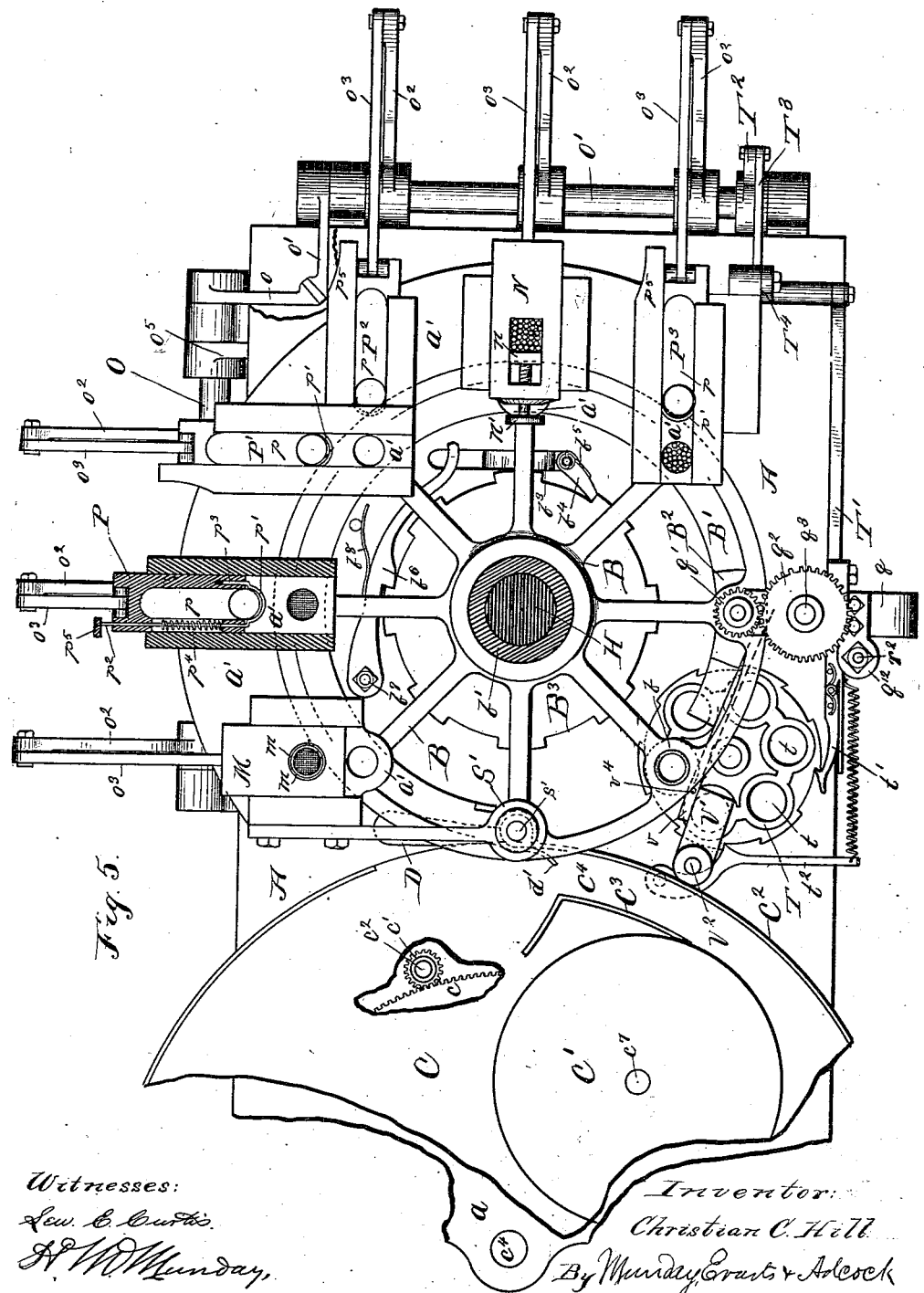
Witnesses:
Lew. E. Curtis.
H. W. Munday.
Inventor:
Christian C. Hill
By Munday, Evarts & Adcock
his Attorneys.

(No Model.)  6 Sheets—Sheet 5.
C. C. HILL.
CARTRIDGE LOADING MACHINE.
No. 389,385.  Patented Sept. 11, 1888.
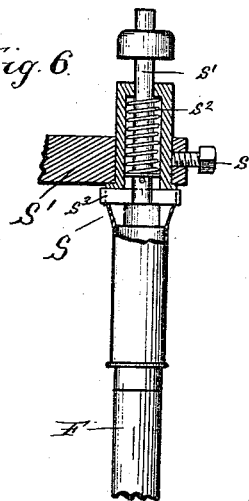
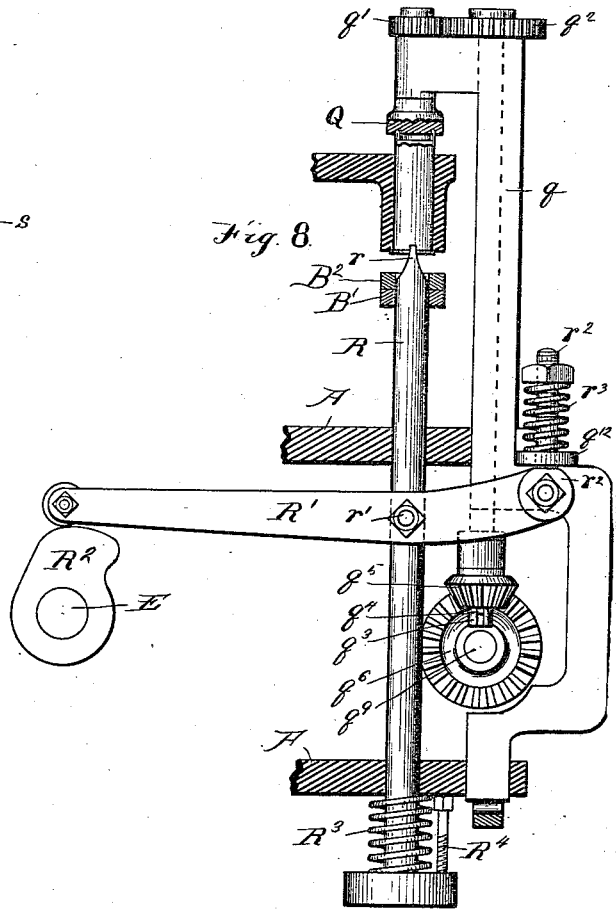
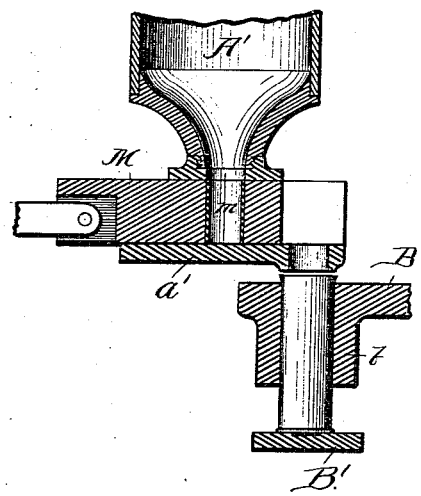
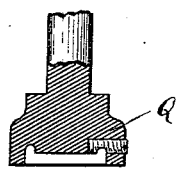
Witnesses:  Inventor:
Christian C. Hill
By Munday, Evarts & Adcock
his Attorneys (No Model.)  
6 Sheets—Sheet 6.
C. C. HILL
CARTRIDGE LOADING MACHINE.
No. 389,385. Patented Sept. 11, 1888.
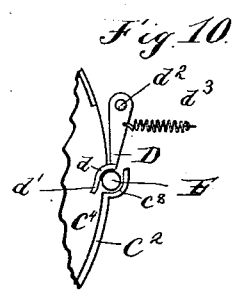
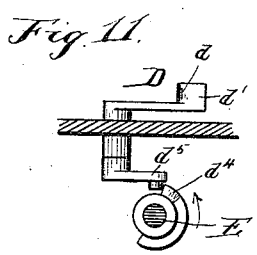
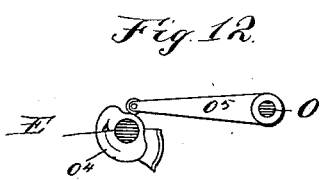
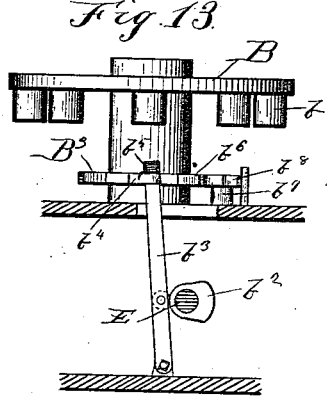
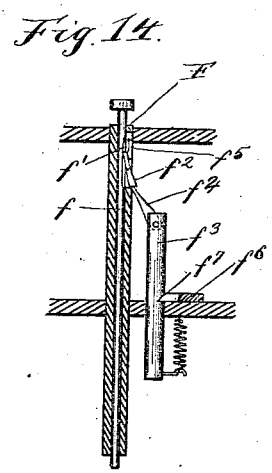
Witnesses:  
Lew. C. Curtis.  
H. W. Munday,
Inventor:  
Christian C. Hill  
By Munday, Evarts & Adcock  
his Attorneys.

UNITED STATES PATENT OFFICE.

CHRISTIAN C. HILL, OF CHICAGO, ILLINOIS, ASSIGNOR, BY MESNE ASSIGNMENTS, TO E. W. BLATCHFORD, OF SAME PLACE.

CARTRIDGE-LOADING MACHINE.

SPECIFICATION forming part of Letters Patent No. 389,385, dated September 11, 1888.

Application filed April 16, 1888. Serial No. 270,832. (No model.)

*To all whom it may concern:*

Be it known that I, CHRISTIAN C. HILL, a citizen of the United States, residing in Chicago, in the county of Cook and State of Illinois, have invented a new and useful Improvement in Cartridge-Loading Machines, of which the following is a specification.

My invention relates to machines for loading cartridges, and more particularly to improvements upon the machine shown and described in my pending application, No. 250,570, filed September 24, 1887.

My present improvement consists in the novel devices and novel combinations of parts or devices herein shown and described, and more particularly pointed out in the claims.

Figure 1:
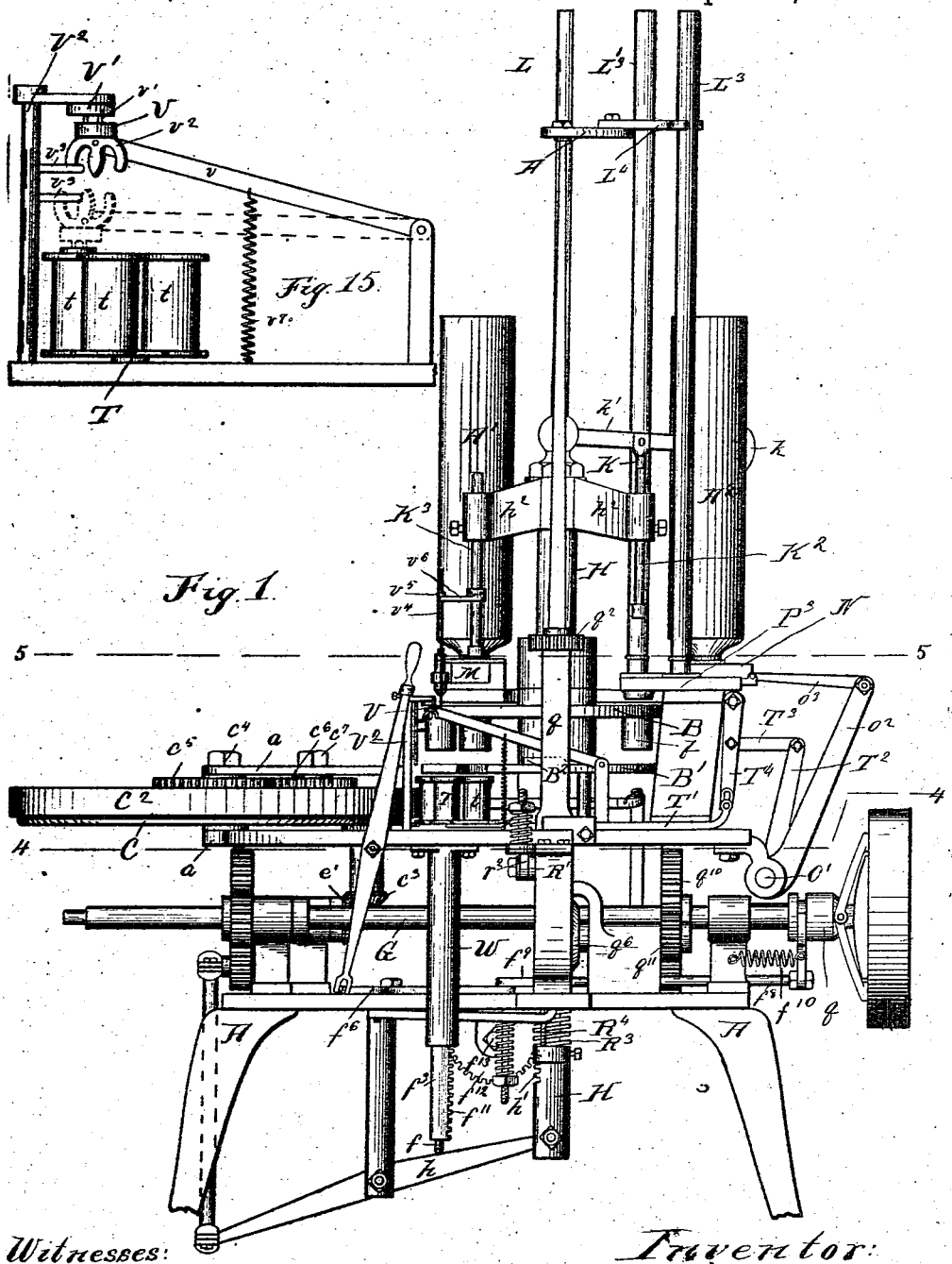
Figure 2:
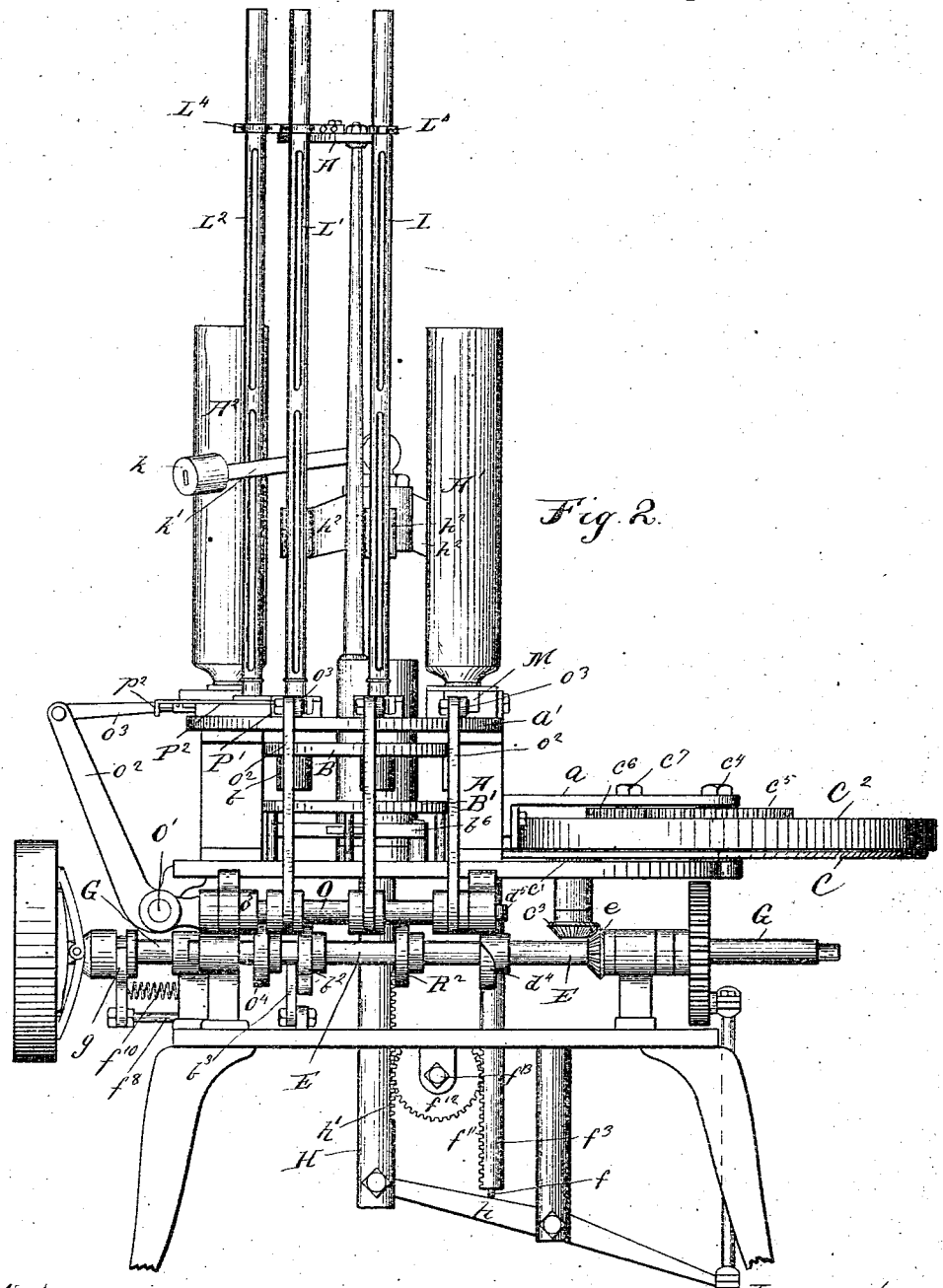
Figure 3:
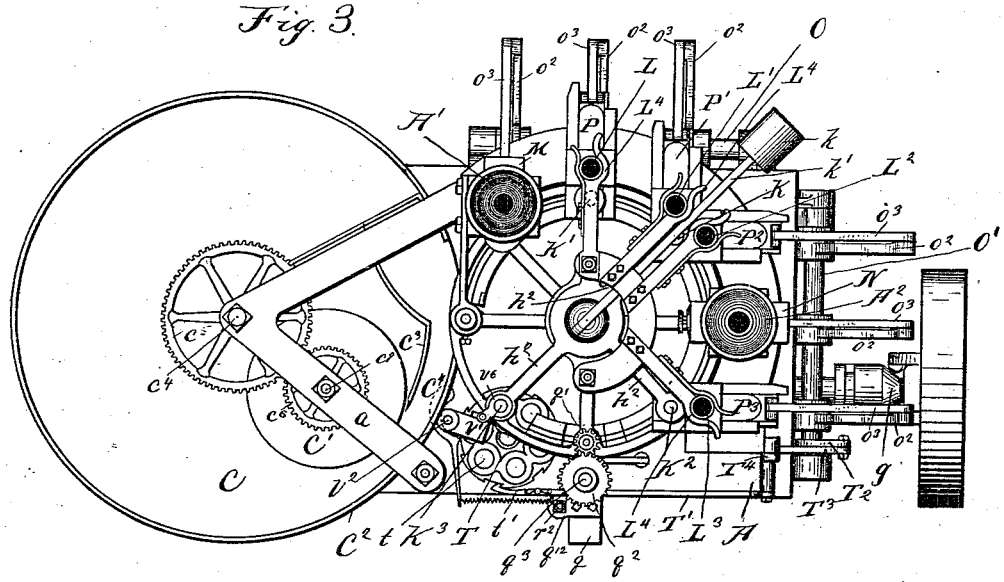
Figure 4:
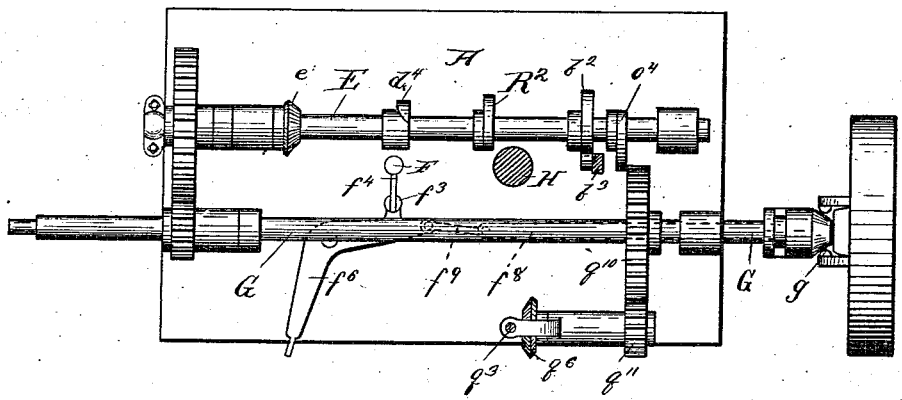

In the accompanying drawings, which form a part of this specification, and in which similar letters of reference indicate like parts, Figures 1 and 2 are side elevations of a machine embodying my invention, looking from opposite sides. Fig. 3 is a plan view. Fig. 4 is a horizontal section on line 4 4 of Fig. 1. Fig. 5 is an enlarged horizontal section taken on line 5 5 of Fig. 1, one of the wad-feed slides being shown in section. Fig. 6 is a detail vertical section of the plunger for spreading the mouth of the shell. Fig. 7 is a detail section of the powder-feed slide. Fig. 8 is a detail sectional view showing the crimper mechanism. Fig. 9 is an enlarged sectional view of the crimper. Fig. 10 is a detail plan view showing the shell-feed gate. Fig. 11 is a detail view of the cam for operating the feed-gate lever. Fig. 12 is a detail view of the wad-feed slide operating-lever and cam. Fig. 13 is a detail view showing the mechanism for revolving the shell-carrier. Fig. 14 is a detail vertical section of the shell-feed plunger, showing the mechanism for stopping the machine in case no shell is presented to be fed into the shell-carrier; and Fig. 15 is a detail view of the shell-marking mechanism.

In said drawings, A represents the frame of the machine, which may be of any suitable construction; A', the powder-holder, and $A^2$ the shot-holder.

B is the intermittently-revolving shell-carrier, having, preferably, eight holes or receptacles, $b$, to receive the shells. This shell-carrier B is journaled on a hollow stud, $b'$, on the frame of the machine. The shell-carrier is intermittently revolved and locked or held stationary between the intervals of its movement by means of a cam, $b^2$, lever $b^3$, pawl $b^4$, having spring $b^5$, and a locking pawl, $b^6$, pivoted at $b^7$ to the frame and furnished with spring $b^8$.

C is a continuously-revolving shell-feed disk journaled on the frame bracket $a$; C', an oppositely-revolving feed-roller above the disk C; $C^2$, a stationary rim or guard secured to said bracket above the feed-disk C; and $C^3$ an inside guide-rim, which, in connection with the rim $C^2$ and the inside roller, C', constitutes a shell-feed passage, $C^4$, through which the shells are advanced in single file by the revolving disk C' to the shell-feed gate D. The disk C is furnished on its under side with a toothed shoulder or gear, $c$, which meshes with a gear, $c'$, secured to the shaft $c^2$, through which motion is imparted to said feed-disk C. The shaft $c^2$ has a bevel-gear, $c^3$, and receives motion from the counter-shaft E through the bevel gear $e'$ thereon. The shaft $c^4$ of the feed-disk C is furnished with a gear, $c^5$, which drives the gear $c^6$ on the shaft $c^7$ of the roller C'.

The feed-gate D is provided with a pocket, $d$, to receive the shell, and with a projecting end, $d'$, to close the shell-feed passage $C^4$, and it vibrates horizontally on its vertical shaft or pivot $d^2$, and thus operates to move the shells one by one off of the feed-disk C and deliver them above the shell-feed plunger F. The guard or guide rim $C^2$, which forms a part of the shell-feed passage, is provided with a pocket, $c^8$, between which and the pocket $d$ of the feed-gate lever the shell is clamped, guided, or held as the shell is forced up into the shell-receptacle $b$ of the carrier B by the feed plunger F. The feed-gate D is operated by a spring, $d^3$, so as to give a quick as well as a yielding motion to the feed-gate lever when the same is delivering the shell to the shell-feed plunger F from the shell-passage $C^4$. The feed-gate lever D is opened or moved in the opposite direction by means of a cam, $d^4$, on the shaft E, which impinges against the arm $d^5$, secured to the shaft $d^2$ of the feed gate lever.

The feed-plunger F is made hollow and provided with a sliding pin, $f$. This sliding pin $f$ is furnished with a longitudinal cam-groove, $f'$, that operates a pawl, $f^2$, pivoted to the plunger F, so that said pawl $f^2$ will engage, or not engage, the clutch-operating pin $f^3$, according as a shell is absent or present above the feed-plunger, to be fed or forced up into the shell-carrier. The clutch-operating slide $f^3$ is preferably furnished with a pivoted catch, $f^4$, though the pawl $f^2$ may, if desired, engage directly instead of indirectly the slide $f^3$. The pawl $f^2$ is held in place by a spring, $f^5$. The clutch $g$ on the main driving-shaft G is operated from the sliding pin $f^3$ through the medium of a lever, $f^6$, (which is engaged by a cam, $f^7$, on the slide $f^3$,) and the clutch-rod $f^8$ and connecting-link $f^9$ and clutch-operating spring $f^{10}$. The spring $f^{10}$ does the work of moving the clutch, the slide $f^3$ simply operating to move the bent arm of the lever $f^6$ and the connecting-link $f^9$ past the central line through the pivots, so that the spring $f^{10}$ can act.

The feed-plunger F is reciprocated up and down by a rack, $f^{11}$, thereon, which engages a gear, $f^{12}$, on the stud or shaft $f^{13}$. The clutch-operating pin $f$ in the plunger F is pushed up, as shown in Fig. 14, at each descending movement of the feed-plunger F by striking against the lever $h$, which acts as a stop for the pin $f$ to impinge against. The gear $f^{12}$ is operated by a rack, $h'$, on the vertically-reciprocating bar H, which operates to lift the rammers. This bar H slides in the hollow stud $b'$ as a guide.

The sliding bar H is furnished at its upper end with four radial arms, $h^2$, which carry, respectively, the wad-rammers or plungers K K' K² and the discharge-plunger K³. The plungers K' K² K³ may be secured rigidly to the arms $h^2$ of the bar H; but the main powder-rammer K slides freely in its guide-arm $h^2$, said arm operating simply to raise the plunger. This rammer K is provided with a weight, $k$, which is preferably attached to the end of a lever, $k'$, pivoted to the plunger K and to the sliding bar H. This weight determines the force or pressure exerted by the rammer K upon the final powder-wad.

L L' L² L³ are the wad-holders. These are each removably secured in place above the wad-feed slides by spring-clamps L⁴ L⁴, so that the wad holders or tubes may be conveniently removed for the purpose of refilling them with wads.

The powder-feed slide M reciprocates beneath the powder-holder A' and above the frame-plate $a'$ in suitable guides. This powder-feed slide consists simply of a block with a hole through it adapted to receive the graduated powder-charge thimbles $m$. The powder-charge thimbles $m$ nest one within another. By means of these nesting-thimbles any desired charge of powder may be measured with great accuracy.

The shot-feed slide N is mounted in a similar manner under the shot-holder A² and above the frame-plate $a'$, between which it reciprocates. The charge of shot is regulated by a sliding plate or wall, $n$, which is adjusted by a screw, $n'$.

The mechanism, as shown in the drawings, is adapted to feed four wads into each shell—three on top of the powder and one on top of the shot. The four wad-feed slides P P' P² P³ are all constructed alike, and each is mounted to reciprocate between its wad-holder and the frame-plate $a'$ below in suitable guides. The wad-feed slides P P' are mounted to reciprocate in guides parallel to the powder-feed slide M, so that these two wad-feed slides and the powder-feed slide may be all simultaneously operated from the same rock-shaft, O; and the wad-feed slides P² P³ reciprocate parallel to the shot-feed slide N, so that these three slides may be simultaneously operated from the same rock-shaft, O', which is connected to and given the same and simultaneous movement with rock-shaft O by means of the bevel-gears $o$ $o'$. These gears $o$ $o'$ are but short segments, as only a slight movement is required to be given to the rock-shafts. Each of the wad-feed slides consists of a slotted or forked block carrying a plate, $p$, having a semicircular end corresponding to the circumference of the wad, and is provided with a semicircular wad-clamp, $p'$, having sliding arms $p^2 p^3$, fitting in suitable holes in the wad-feed slide. The longer arm, $p^2$, is provided with a light spiral spring, $p^4$, which operates to close the clamp-arm $p'$ against the wad. The wad-clamp $p'$ is opened when the wad-slide is retracted beneath the wad-holder in position to receive the wad by the arm $p^2$ impinging against a fixed stop, $p^5$, on the frame. When the wad-feed slide advances to feed the wad over the mouth of the shell, the wad-clamp $p'$ clamps the wad, so as to hold it flat over the mouth of the shell until the wad-rammer or plunger descends and forces it into the shell. This prevents any danger of the wads entering the shell edgewise or askew.

It will be observed that the wad-feed slides P' P² are arranged at right angles to each other and operate to feed two wads over the same opening in the plate $a'$, so that the two will be forced simultaneously into the shell by the same plunger or rammer. The wad-feed slide P² reciprocates beneath the wad-feed slide P'.

Motion is communicated to the six slides M N P P' P² P³ by arms or levers $o^2$ on the rock-shafts O O' and connecting-links $o^3$. Motion is communicated to the rock-shaft O by a cam, $o^4$, on the shaft E and arm or lever $o^5$ on the rock-shaft O. The shells are crimped by a continuously-revolving crimper, Q, between which and the shell holding plunger R the shell is clamped during the crimping operation. The crimper Q is journaled on a sliding bar, $q$, and is revolved by a gear, $q'$, on the crimper-shaft, which meshes with a gear, $q^2$, on the shaft $q^3$. The shaft $q^3$ is furnished with a spline, $q^4$, at the lower end, and is provided with a bevel-gear, $q^5$, which meshes with a bevel-gear, $q^6$, on the counter-shaft $q^9$, which is driven from the main driving-shaft through the gears $q^{10}$ $q^{11}$. The shell-holding plunger R is provided with shell-holding jaws $r$, adapted to grasp the rim of the shell and hold it from revolving during the crimping operation. The crimper-bar $q$ and plunger R are forced together, so as to clamp the shell endwise between the crimper Q and plunger R, by means of a lever, R′, which is pivoted at $r'$ to the plunger R and at its end to the sliding bar $q$ through the medium of the sliding pin $r^2$ and spring $r^3$. The spring $r^3$ impinges against a shoulder or projection, $q^{12}$, on the sliding bar $q$, through which said pin $r^2$ slides. The lever R′ is operated by a cam, R², on the shaft E. The plunger R is also furnished with a spring, R³, and a stop-pin, R⁴, which impinges against the frame and limits the upward movement of the plunger R. As the shell is forced up between the guide-jaws $d$ and $c^3$ of the gate-lever D and guide-rim C² by the feed-plunger F into the shell-receptacle $b$ of the carrier B, the mouth of the shell is spread or made slightly flaring by a stationary plunger, S, which is adjustably secured to an arm, S′, by a set-screw, $s$, which arm S′ is bolted to the frame of the machine. The plunger S is made hollow and is provided with a sliding pin, $s'$, operated by a spring, $s^2$, and provided with a cross-arm, $s^3$, which works in a suitable slot in the spreading-plunger S. The function of this pin $s'$ and its cross-arm $s^3$ and spring is to force the shell off of the spreading-plunger. By this means the feed-plunger is made not only to feed the shells into the carrier, but also to force them against the spreading-plunger. The spring-extractor $s'$ pushes the shell down off of the spreading-plunger S, so that the shell may move forward in the carrier when the carrier next advances or turns. After the shell has been crimped it is forced out of the shell-carrier B by the discharge-plunger K³ and at the same time delivered into an intermittently-revolving turret, T, which is journaled on the frame of the machine beneath the carrier B. This turret T has shell-receptacles $t$ to receive the shells, and it operates to convey the shells beneath the marker V and then deliver them into the discharge-chute W. The turret T is intermittently revolved and held in position by means of a reciprocating pawl, $t'$, and a spring-locking pawl, $t^2$. The pawl $t'$ is pivoted to the reciprocating bar T′, which is operated by an arm, T², on the rock-shaft O through connecting-link T³ and lever T⁴. The marker V is mounted pivotally on its operating-lever $v$, so that after each impression its type $v'$ may impinge against the inking-pad V′, which is secured to a standard, V². The marker may be turned or reversed as it moves up and down by any ordinary reversing mechanism commonly used in ordinary hand-stamps. That which I prefer to employ is shown in the drawings, and consists, essentially, of a three toothed cam gear, $v^2$, on the type or marker V, which engages two stationary teeth or pins, $v^3$, on the standard V². The marker-lever $v$ is elevated or retracted by a wire rod, $v^4$, having a collar, $v^5$, and an arm, $v^6$, secured to the discharge-plunger K³. The marker-lever $v$ descends by its own weight to strike the blow and make the impression upon the top wad of the cartridge. A spring, $v^7$, may, however, be employed to assist the gravity of the marker arm. As the cartridges are moved around by the carrier B, they rest upon a circular track, B′, which is supported on the frame of the machine. This track B′ is provided with a raised or cam portion, B², to project the top edge of the cartridge-shell up above the top face of the carrier B.

I do not herein claim any improvement which is shown, described, and claimed in my said former application, No. 250,570.

I claim—

1. In a cartridge-loading machine, the combination, with an intermittently-revolving shell-carrier having cells to receive the shells of a powder-holder, a shot-holder, and two or more wad-holders mounted on the frame of the machine above said shell-carrier, of a powder-feed slide, a shot-feed slide, a wad-feed slide reciprocating parallel to said powder-feed slide, and a wad-feed slide reciprocating parallel to said shot-feed slide, all said feed-slides reciprocating on the frame of the machine above said shell-carrier and between the same and said powder, shot, and wad holders, respectively, substantially as specified.

2. In a cartridge-loading machine, the combination, with an intermittently-revolving shell-carrier having a series of cells to receive the shells, a powder-holder, and a wad-holder, of a reciprocating powder-feed slide, and a reciprocating wad-feed slide parallel to said powder-feed slide, a rock-shaft furnished with operating-arms and connecting-links for simultaneously operating both said feed slides, a shot-holder and a second wad-holder, a reciprocating shot-feed slide and a second reciprocating wad-feed slide parallel to said shot-feed slide, a second rock-shaft furnished with operating-arms and connecting links for simultaneously operating both said last-mentioned feed-slides, said second rock shaft being geared to said first-mentioned rock-shaft, and all four of said feed-slides reciprocating on the frame of the machine and between said holders and said shell-carrier and operating to simultaneously convey their respective charges of shot, powder, and wads from said holders to the shells in said carrier, substantially as specified.

3. In a cartridge-loading machine, the combination, with an intermittently-revolving shell-carrier having cells to receive the shells of a powder-holder, and two wad-holders mounted on the frame of the machine above and around said carrier, of a reciprocating powder-feed slide and two reciprocating wad-feed slides, P and P′, parallel to said powder feed slide, a shot-holder and two additional wad-holders mounted on the frame of the machine above and around said carrier, a reciprocating shot-feed slide and two reciprocating wad-feed slides, P² and P³, parallel to said shot-feed slide, said wad-feed slides P′ and P² crossing each other at an angle, one above the other, and operating to deliver their wads simultaneously into the same shell, a rock-shaft, O, furnished with operating-arms and connecting-links for simultaneously operating said powder-feed slide and said wad-feed slides P and P′, and a rock-shaft, O′, geared to said rock-shaft O, and furnished with operating-arms and connecting-links for simultaneously operating said shot-feed slide and said wad-feed slides P² and P³, all six of said feed-slides being mounted on the frame of the machine and reciprocating between said holders and said carrier and operating to simultaneously convey their respective charges of powder, shot, and wads from said holders to the shells, substantially as specified.

4. The combination, with shell carrier B, of a wad-holder above said shell-carrier, reciprocating wad-feed slide P between said wad-holder and shell-carrier, having plate $p$, and semicircular wad-clamp $p'$, furnished with sliding arms $p^2 p^3$, mounted to reciprocate on said slide P, and spring $p^4$, substantially as specified.

5. The combination, with shell-carrier B, of a wad-holder mounted on the frame of the machine above said shell carrier, reciprocating wad-feed slide P, having plate $p$, and semicircular wad-clamp $p'$, furnished with sliding arms $p^2 p^3$, mounted to reciprocate on said feed-slide P, and spring $p^4$, and a stop, $p^5$, on the frame of the machine for opening said spring wad-clamp $p'$, substantially as specified.

6. In a cartridge-loading machine, the combination, with an intermittently-revolving shell-carrier having cells to receive the shells, of a powder-holder and two wad-holders mounted on the frame of the machine above and around said carrier, a reciprocating powder-feed slide, two reciprocating wad-feed slides parallel to said powder-feed slide, all three of said slides being mounted on the frame of the machine above said carrier and reciprocating between their respective powder and wad holders and the shell-cells in said carrier, and rock-shaft O′, furnished with operating-arms $o^2$ and connecting-links $o^3$, for simultaneously operating all of said feed-slides, substantially as specified.

7. The combination, with an intermittently-revolving shell-carrier, of two wad-holders above said shell-carrier and two reciprocating wad-feed slides between said wad-holders and said shell-carrier and arranged at an angle to each other and one above the other, whereby two wads may be simultaneously fed beneath the same rammer from said wad-holders, substantially as specified.

8. The combination, in a cartridge loading machine, of a shell-carrier, a powder-holder above the shell-carrier, and a powder-feed slide between said powder-holder and shell-carrier furnished with a series of nesting powder-charge-measuring thimbles, substantially as specified.

9. The combination, of an intermittently-revolving shell-carrier, B, a discharge-plunger for delivering the loaded shells therefrom, and a secondary shell-carrying turret, T, having shell-holders below the carrier B, and into which the shells are delivered as they are discharged from the carrier B, substantially as specified.

10. The combination, with shell carrier B, of turret T, having shell-holders below said carrier B, discharge-plunger K³ above the shell-carrier B, to force the shells out of the same into the turret, and marker V, said turret T operating to move the shells into position under the marker, substantially as specified.

11. In a cartridge-loading machine, the combination, with shell-carrier B and a supplemental shell-carrying turret, T, arranged below the carrier to receive the shell ejected therefrom, of a reversible marker, V, mounted above said turret, and inker-pad V′, secured above said marker, substantially as specified.

12. The combination, with shell-carrier B and a supplemental turret, T, of reversible marker V, mounted on the frame of the machine above said turret, inker-pad V′, secured to the frame of the machine above said marker, operating-lever $v$, upon which said marker is journaled, and mechanism for raising or retracting said lever, substantially as specified.

13. The combination, with shell-carrying turret T, of reversible marker V above said turret, having cam-teeth $v^2$, standard V², ink-pad V′, secured to said standard above said marker, teeth or pins V³ on said standard, operating-lever $v$, upon which said marker is journaled, lifting-rod $v^4$, having collar $v^5$, and reciprocating plunger K³, furnished with arm $v^6$, through which said lifting-rod $v^4$ passes, substantially as specified.

14. The combination, in a cartridge-loading machine, with cam-shaft E, having cam R², of crimper-operating lever R′, holding-plunger R, pivoted to said lever R′, reciprocating bar $q$, also pivoted to said operating-lever, crimper Q, and shaft $q^3$, journaled on said bar $q$, and connecting-gears $q'$ $q^2$, for revolving the crimper from said shaft $q^3$, and sliding pin $r^2$ and spring $r^3$ connecting said lever R′ and bar $q$, all combined and operating substantially as shown and described.

15. The combination, in a cartridge-loading machine, with cam-shaft E, having cam R², of lever R′, operated by said cam, holding-plunger R, pivoted to said lever, reciprocating crimper-carrying bar $q$, connected to said lever, crimper Q, journaled on said bar $q$, gears $q'$ $q^2$, shaft $q^3$, journaled on said bar $q$, said gears $q'$ and $q^2$ connecting said shaft $q^3$ and the crimper, sliding pin $r^2$ and spring $r^3$ connecting bar $q$ and operating-lever, and spring R³ and stop-pin R⁴, mounted on the holding-plunger R, all combined and operating substantially as shown and described.

16. The combination, with intermittently-revolving shell-carrier B, having cells b, of reciprocating shell-feed plunger F below said shell-carrier, and a stationary conical tool, S, secured to the frame of the machine above said shell-carrier and opposite said feed-plunger F, for spreading the mouth of the shell, substantially as specified.

17. The combination, with intermittently-revolving shell-carrier B, having cells b, of reciprocating shell-feed plunger F and a stationary conical tool, S, for spreading the mouth of the shell, said spreading-tool having a sliding spring-actuated extractor, $s^2$, for pushing the shell off of the spreading-tool, substantially as specified.

18. The combination of shell-carrier B, reciprocating feed-plunger F, stationary spreading-tool S, and sliding pin $s'$, carrying extractor-arm $s^3$ and furnished with a spring, $s^2$, substantially as specified.

19. The combination, in a cartridge-loading machine, of driving-clutch $g$, and a shell-feed plunger, F, furnished with sliding pin $f$, having cam $f'$, pivoted pawl $f^2$, sliding pin $f^3$, having cam $f^7$, and a clutch-operating lever, $f^6$, and mechanism connecting said lever $f^6$ and clutch $g$, substantially as specified.

20. The combination, with intermittently-revolving shell-carrier B, furnished with circular ratchet $B^3$, attached thereto, of pawl-lever $b^3$, pawl $b^4$, pivoted to said lever $b^3$ and engaging said ratchet, and a spring locking-pawl, $b^6$, pivoted to the frame of the machine and engaging said ratchet, substantially as specified.

CHRISTIAN C HILL.

Witnesses:
EDW. S. EVARTS,
H. M. MUNDAY.